United States Patent
Pitzal et al.

(10) Patent No.: US 9,358,985 B2
(45) Date of Patent: Jun. 7, 2016

(54) METHOD AND DEVICE FOR CONTROLLING A DRIVE UNIT OF A VEHICLE

(75) Inventors: Volker Pitzal, Waldstetten/Wissgoldingen (DE); Oliver Froehlich, Eberdingen-Hochdorf (DE); Wolfram Gerwing, Hessigheim (DE); Martin Grosser, Stuttgart (DE); Franz Laermer, Weil Der Stadt (DE); Udo Schulz, Vaihingen/Enz (DE); Thomas Proepper, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1763 days.

(21) Appl. No.: 11/920,360

(22) PCT Filed: May 2, 2006

(86) PCT No.: PCT/EP2006/061967
§ 371 (c)(1),
(2), (4) Date: Jan. 16, 2009

(87) PCT Pub. No.: WO2006/120128
PCT Pub. Date: Nov. 16, 2006

(65) Prior Publication Data
US 2009/0171524 A1 Jul. 2, 2009

(30) Foreign Application Priority Data
May 12, 2005 (DE) .......................... 10 2005 021 952

(51) Int. Cl.
*F02D 7/00* (2006.01)
*F02D 28/00* (2006.01)
(Continued)

(52) U.S. Cl.
CPC ....... *B60W 50/0205* (2013.01); *B60G 17/0185* (2013.01); *F02D 41/022* (2013.01);
(Continued)

(58) Field of Classification Search
CPC ............ B60W 50/0205; B60W 40/13; B60W 2520/105; B60W 2520/125; B60W 2520/16; B60G 17/0185; F02D 41/0215; F02D 41/022; F02D 41/10; F02D 41/2096; F02D 41/222
USPC .............................. 180/282; 701/38, 114, 123
See application file for complete search history.

(56) References Cited

U.S. PATENT DOCUMENTS

| 5,212,640 A | 5/1993 | Matsuda et al. |
| 5,402,345 A | 3/1995 | Kost ........................ B60T 8/172 180/197 |

(Continued)

FOREIGN PATENT DOCUMENTS

| DE | 42 28 413 | 3/1994 |
| DE | 199 28 477 | 12/2000 |
| DE | 103 15 410 | 10/2004 |

OTHER PUBLICATIONS

International Search Report, PCT International Patent Application No. PCT/EP2006/061967, dated Aug. 2, 2006.

*Primary Examiner* — John Q Nguyen
*Assistant Examiner* — Rodney P King
(74) *Attorney, Agent, or Firm* — Kenyon & Kenyon LLP

(57) ABSTRACT

A method and a device for controlling a drive unit of a vehicle are provided in which, starting from the comparison of a first acceleration variable, which is calculated at least from the operating state of the drive unit, and a second acceleration variable, an error is detected. The second acceleration variable includes a first component, in the direction of the vehicle longitudinal axis, and a second component, perpendicular to the vehicle longitudinal axis.

27 Claims, 4 Drawing Sheets

(51) Int. Cl.
*B60W 50/02* (2012.01)
*B60G 17/0185* (2006.01)
*F02D 41/02* (2006.01)
*B60W 40/13* (2012.01)
*F02D 41/10* (2006.01)
*F02D 41/20* (2006.01)
*F02D 41/22* (2006.01)

(52) U.S. Cl.
CPC ............ *F02D41/0215* (2013.01); *B60W 40/13* (2013.01); *B60W 2520/105* (2013.01); *B60W 2520/125* (2013.01); *B60W 2520/16* (2013.01); *F02D 41/10* (2013.01); *F02D 41/2096* (2013.01); *F02D 41/222* (2013.01)

(56) References Cited

U.S. PATENT DOCUMENTS

| | | | |
|---|---|---|---|
| 6,368,248 | B1 | 4/2002 | Bauer et al. |
| 2001/0044359 | A1 | 11/2001 | Saito et al. ...................... 477/92 |
| 2002/0041229 | A1 | 4/2002 | Satoh et al. .......... G05D 1/0246 340/438 |
| 2002/0133288 | A1 | 9/2002 | Minami et al. ................ 701/114 |
| 2003/0102178 | A1 | 6/2003 | Ide et al. ....................... 180/282 |
| 2003/0125864 | A1 | 7/2003 | Banno et al. |
| 2004/0157703 | A1 | 8/2004 | Eriksson et al. ................ 477/98 |
| 2004/0167705 | A1 | 8/2004 | Lingman et al. .............. 701/124 |
| 2005/0085950 | A1 | 4/2005 | Altenkirch |
| 2005/0216154 | A1 | 9/2005 | Lehmann et al. ............... 701/38 |
| 2007/0168107 | A1 | 7/2007 | Von Schwertfuehrer |

METHOD AND DEVICE FOR CONTROLLING A DRIVE UNIT OF A VEHICLE

FIELD OF THE INVENTION

The present invention relates to methods and devices for controlling a drive unit of a vehicle.

BACKGROUND INFORMATION

German Published Patent Application No. 199 28 477 describes a method and a device for controlling a drive unit of a vehicle. In that document, starting from the comparison of a first acceleration variable, which is calculated at least starting from the operating state of the drive unit, and a second acceleration variable, an error is detected in the field of fuel metering. The second acceleration variable is recorded using an acceleration sensor which directly detects the vehicle acceleration.

Furthermore, German Published Patent Application No. 103 15 410 describes a method and a device in which, starting from the desired torque and the actual torque of the internal combustion engine that is calculated starting from the operating state of the internal combustion engine, errors are detected.

SUMMARY

The disadvantage in both of the foregoing methods is that an accurate monitoring is possible only at very high expenditure. An accurate calculation of the actual torques, starting from operating states such as the injected fuel quantity and the rotational speed, is very costly. This applies particularly to modern internal combustion engines, that have an exhaust gas aftertreatment system, in which not the entire fuel quantity is converted into torque, but in which a part of the injected fuel quantity is required for the exhaust gas aftertreatment. In such systems, the expenditure rises greatly, especially within the scope of the application. That is, various characteristics maps and characteristic quantities have to be recorded for each individual vehicle, and stored.

Because the second acceleration variable includes a first component in the direction of the vehicle longitudinal axis, and a second component perpendicular to the vehicle longitudinal axis, a substantially more accurate and simpler monitoring is possible. Because one component perpendicular to the vehicle axis is taken into consideration, uphill and downhill travel can certainly be detected, and a correspondingly accurate acceleration value can be determined. This means that the second acceleration variable is used for detecting the operating state. The second acceleration variable is used as second operating state, or rather, the operating state is detected starting from the second acceleration variable.

The second acceleration variable may be measured using a suitable sensor. Such acceleration sensors are available inexpensively. Corresponding acceleration sensors are used, for instance, in other systems, such as in an ABS system or an ESP system. These sensors supply acceleration variables having several components. They particularly have a component in the direction of the vehicle longitudinal axis and in the direction perpendicular to the vehicle longitudinal axis.

A simple sensor may be used which only records the acceleration in the vehicle longitudinal axis, and the second component is calculated using other variables. For example, the second component can be ascertained in a simple manner using an inclination sensor. Alternatively, it may also be provided that a corresponding value is derived from a signal which characterizes the atmospheric pressure and/or the atmospheric pressure change, or from a GPS signal.

The vehicle's mass may be used for determining the first acceleration variable, since it has a substantial influence on the acceleration.

At least the variable characterizing the injected fuel quantity may be taken into consideration as the operating state of the drive unit. Such a variable that characterizes the injected fuel quantity is, for example, the duration of activation of a control element or the angle the crankshaft and/or the camshaft sweeps over during the activation. Besides these variables, other variables characterizing the injected fuel quantity can also be used, which may be present internally in the control unit.

A fixed vehicle mass may be assumed. A substantial improvement of the monitoring comes about if in each case the current vehicle mass is ascertained and used for the monitoring. In certain operating states, the vehicle mass may be calculated at least starting from the vehicle-specific characteristic variables and the acceleration.

Using the method described and the procedure described, it is possible to have direct monitoring of the vehicle for undesired accelerations. Using the method, one obtains a clear reduction in the complexity of the monitoring of the control unit, and this applies particularly for functional monitoring. Development times and application times and costs are clearly reduced and, at the same time, reliability and accuracy can clearly be increased. The method according to example embodiments of the present invention is independent of the combustion method and the type of drive, and can therefore be used for all drives of vehicles, such as especially Diesel vehicles, gasoline engines, electric drives and hybrid drives.

Exemplary embodiments of the present invention are shown in the drawings and are explained in more detail in the following description.

DETAILED DESCRIPTION

Figure 1:
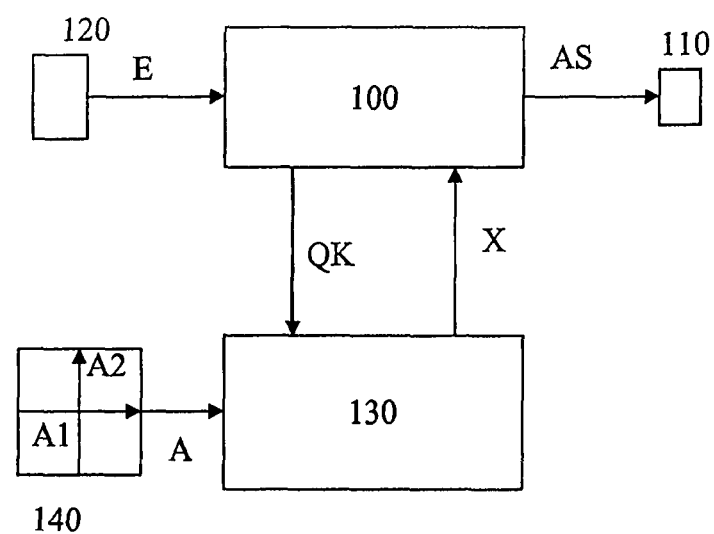
FIG. 1 a block diagram of a device according to an example embodiment of the present invention, FIGS. 2 & 3 flow charts for clarifying the procedure according to example embodiments of the present invention.

FIG. 1 shows a device for controlling a drive unit of a vehicle. In the following, the procedure of example embodiments of the present invention is described using a Diesel internal combustion engine as an example. The procedure according is not restricted to such a Diesel internal combustion engine. It can basically be used for all drives of vehicles. Only the appropriate actuating variables and input variables have to be used in this context.

A control unit is designated by 100. It controls a control element 110 which influences, for instance, the fuel quantity that is to be injected. This control element 110 is, for instance, a magnetic valve or a piezo actuator which establishes the fuel quantity to be injected via an injector of a common rail system or via a unit injector. The control signal AS which control unit 100 applies to control element 110 is ascertained starting from various input variables E that are applied to control unit 100 by various sensors 120. Such devices are generally conventional. According to example embodiments of the present invention, it is provided that a monitoring unit 130 exchanges signals QK and X with control unit 100. Furthermore, signal A of an acceleration sensor 140 is supplied to monitoring unit 130.

Starting from input variables E, which characterize the state of the vehicle and the operating state of the drive unit, control unit 100 calculates activating signal AS for activating control element 110. A certain fuel quantity is metered to the internal combustion engine as a function of the activating signal of control element 110.

To monitor the drive unit, it is provided that monitoring unit 130 detects an error in response to the comparison of a first acceleration variable with a second acceleration variable. The first acceleration variable is calculated, in this context, starting from the operating state of the drive unit. The injected fuel quantity QK especially characterizes the operating state. Any other variables that characterize the fuel quantity can also be used instead of fuel quantity QK. This especially applies to the control duration of the control element or the control angle for which the control element is being controlled. Alternatively to these variables, all variables that are present in control unit 100 and which characterize the fuel quantity may be used.

Starting from these variables with regard to the operating state, monitoring unit 130 calculates a first acceleration variable AW. Acceleration sensor 140 supplies a second acceleration variable A which corresponds to the actual acceleration. The monitoring device detects errors starting from the comparison of these two acceleration variables. In particular, the monitoring device detects errors if actual acceleration variable A is greater than first acceleration variable AW, that is, it is the desired acceleration variable.

Acceleration sensor 140, in this context, is arranged so that it is able to supply two signals, the first component A1 of the signal giving the acceleration in the direction of the vehicle's longitudinal axis, and the second component A2 giving the acceleration perpendicular to the vehicle longitudinal axis.

The first acceleration variable AW, which corresponds to the desired acceleration of the vehicle, is calculated, starting from the forces acting upon the vehicle and the vehicle's mass M according to the formula: AW=F/M. Here, F is the force acting upon the vehicle and M is the mass of the vehicle. This requires the mass M to be known.

In an example embodiment, it is provided that mass M be specified as a fixed value which characterizes the vehicle. Since, as a rule, the mass of the vehicle in operation is greater than the vehicle mass in the empty state, at all events, too small a real acceleration comes about. This leads to the measured acceleration being, at all events, less than the desired acceleration, and is consequently also not detected erroneously as an error "undesired acceleration". However, an error that occurs is certainly detected in every case, if the measured acceleration is greater than the desired acceleration.

Figure 2:
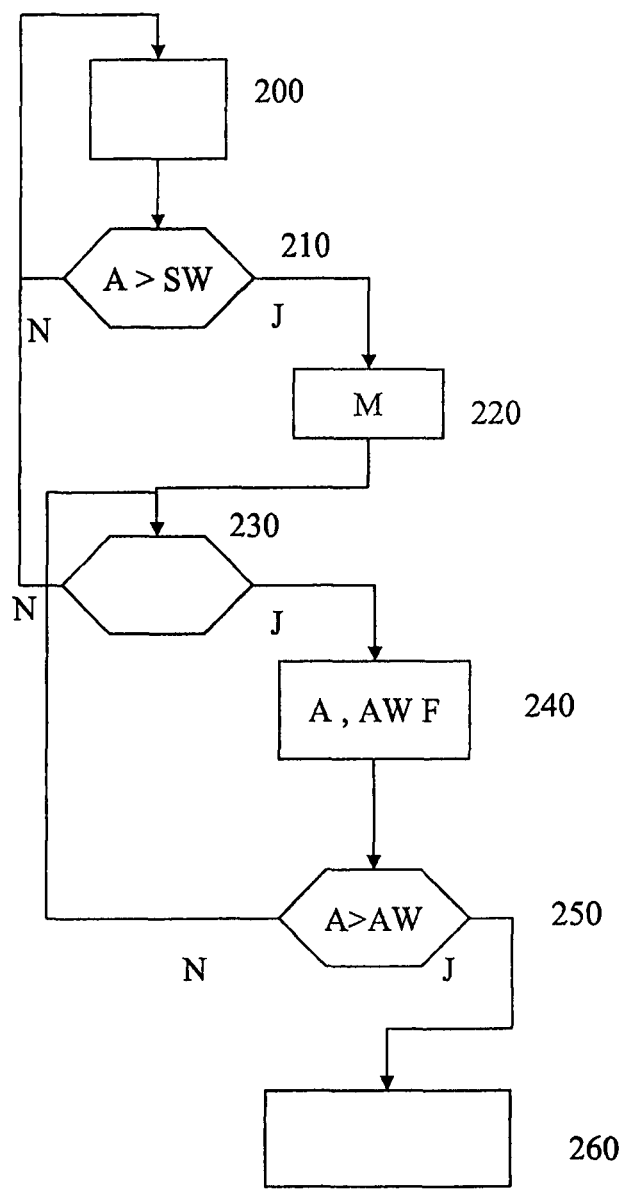

Every more accurate vehicle mass determination improves the detection of "undesired acceleration". In the case of one improved specific embodiment, the vehicle mass is ascertained in certain states and used for monitoring. A corresponding procedure is illustrated in FIG. 2. In a first step 200 it is recognized whether the vehicle is standing still. A query 210 checks whether there is an acceleration of the vehicle. For this, the output signal of acceleration sensor 140 in particular is evaluated. If query 210 detects that there is no acceleration, step 200 is repeated. If query 210 detects that there is an acceleration of the vehicle, which is detected, for example, if output signal A of acceleration sensor 140, and in that case especially component A1 in the travel direction, is greater than a threshold value SW, there follows step 220.

In step 220, as will be described, vehicle mass M is ascertained. There follows query 230. Query 230 checks whether the vehicle is traveling. If this is the case, there follows step 240. In this step, the force F that acts upon the vehicle, acceleration AW that is desired, as well as acceleration A which is ascertained by the acceleration sensor are recorded. Subsequent query 250 checks whether there is an error. In particular it is checked whether the actual acceleration A, which is measured using acceleration sensor 140, is greater than desired acceleration AW. If this is the case, error is detected in step 260. If this is not the case, query 230 is repeated. If query 230 detects that the vehicle is not traveling, the system transits to step 200.

According to example embodiments of the present invention, vehicle mass M is calculated after each standstill, when the first acceleration takes place. During the subsequent travel operation of the vehicle, this mass is used for the calculation of desired acceleration AW. Desired acceleration AW is yielded as a result of the forces that act upon the vehicle. If it is detected that the vehicle is accelerating in an undesired manner, error is detected. A detected error is reported back to the control unit via signal X.

The recalculation of the vehicle mass after each start results in a clear improvement of the accuracy of the method. In this context, it is taken into account that normally an increase or decrease of the mass takes place only when the vehicle is standing still. A change in the mass, during travel, to an extent that is able to have an influence on error monitoring, is extremely improbable.

According to the present invention, one may conclude, from the comparison of measured acceleration A in the longitudinal direction of the vehicle to acceleration AW calculated by the control unit, that there is an influence of the internal combustion engine and the injection system in the control unit and, with the aid of the plausibility check described below, one may conclude there is an erroneously or correctly functioning control unit, including its periphery such as sensors and actuators or their functions.

The change in the vehicle acceleration is a function of various influence variables, such as the change in the engine torque and the change in the road resistance. The rolling resistance, the air resistance and the climbing resistance, in particular, go into the road resistance. The transition resistance of the drive train is assumed to be constant. A change in the weather conditions, the facts concerning the roadway and the rolling resistance are of little influence, and are not taken into consideration in one simple form. These can be recorded by a suitable sensor, and taken into consideration. In order to make possible an error detection which recognizes undesired accelerations, the comparison between a calculated setpoint acceleration and the measured actual acceleration is required, or a comparison between a setpoint acceleration change and an actual acceleration change. The vehicle mass is required for calculating the setpoint acceleration and the setpoint acceleration change. In an example embodiment, it is provided that the vehicle curb weight is used as the mass, since any increase in mass leads to a more sluggish vehicle reaction. An example embodiment requires a mass determination. According to example embodiments of the present invention, the determination and storage of the vehicle mass takes place only when a prior checking for undesired acceleration did not detect any corresponding undesired acceleration.

The following procedure is followed for the plausibility check of the various signals and for the error detection. Various travel states are differentiated according to example embodiments of the present invention, and in the different travel states, different signals and variables are compared to one another.

In normal travel operation, that is, when query 230 detects that the vehicle is traveling, a first query 300 checks whether the vehicle is traveling on level ground. This is detected, for example, by evaluating the acceleration sensor, the first and the second component being evaluated. If the acceleration sensor detects a change in the absolute quantity of the acceleration in the direction of the longitudinal axis, and if, at the same time, the acceleration sensor detects no acceleration perpendicular to the vehicle, then query 300 detects the state of "travel on level ground". If this is the case, query 310 checks whether the vehicle is coasting.

If this is the case, that is, that the vehicle is traveling on level ground while coasting, it is checked in block 410 whether an error has occurred. In this state, in which the vehicle is coasting on level ground, at the onset of the coasting, a negative acceleration of the sensor element along the vehicle axis has to be measured, since in this state the vehicle loses speed. If a positive acceleration of the vehicle occurs in this state, which is measured by the sensor element in line with the vehicle, an error is detected. In this case, injection is preferably shut off as an emergency measure, since a travel state critical to safety is occurring.

The coasting is detected in step 310, e.g., in that there is an accelerator that is not being operated. Alternatively, another signal can also be used, which indicates the torque command. That is, query 310 checks whether there is a torque command. If this is not the case, then the onset of this travel state on level ground has to generate a deceleration of the vehicle.

If query 310 does not detect coasting, it is checked in step 320 whether the clutch has been operated or not, and in an automatic transmission it is checked whether the converter is open or closed. Corresponding signals are usually present in the control unit, and are evaluated accordingly.

If the clutch is not disengaged, that is, the vehicle is moving in the normal travel state on level ground, the signals are checked in block 420 as follows, for plausibility. In this state the driver regulates, by setting the accelerator, the necessary torque command for the desired acceleration. If there is a change in the absolute quantity of the component of the acceleration in the direction of the vehicle's longitudinal axis, without the driver having changed the pedal value to an extent worth mentioning, one has to assume that an error has occurred. This says that, if the change in component A2 exceeds a threshold value, and if, at the same time, the change in the driver's command is less than a threshold value, an error has occurred.

If the vehicle continues to accelerate, as not desired, the driver will reset the operation of the accelerator, as usual. This has the result that, after a certain time, coasting is detected, that is, the system transits to block 410. Even in the case of an error in block 420 that is not detected, it is achieved by the usual reaction of the driver that a second monitoring engages, and the error is certainly detected.

Alternatively to the evaluation of the change in the acceleration value, one may also proceed as follows: The force afforded by the engine is calculated by the control unit with the aid of the injected fuel quantity. This force is reduced by outer road resistances, such as the rolling resistance and the air resistance and the drive train losses. The remaining force leads to acceleration of the vehicle. Starting from the mass of the vehicle and this force, one is able to calculate the desired acceleration. The corresponding variables, such as the fuel quantity or the driver's command, based on which the engine force is calculated, are present in the control unit. Other variables, such as drive train losses, rolling resistance and air resistance are known, or rather, are typical of the vehicle, and are ascertained once when the vehicle is first put into use and assume a fixed value, and are stored in a memory.

The cornering resistance may be taken into consideration. A corresponding cornering resistance and a corresponding cornering can be detected with the aid of a yaw rate sensor or a steering angle sensor in the vehicle, and taken into consideration. Consequently, starting from the remaining drive force F and the vehicle mass M, the desired acceleration AW is yielded, according to the formula AW=F/M. This desired acceleration AW thus calculated, is compared to measured acceleration A1 of the sensor element lengthwise of the vehicle. If tolerances and inaccuracies are considered, a difference is yielded. If this difference between the two accelerations is greater than an applicable threshold value, the monitoring unit detects an error.

If query 320 detects that the clutch is disengaged or the converter is open, the following monitoring takes place in block 430. During travel on flat ground, having an open converter or an activated clutch, the internal combustion engine is held to idling speed by the idling speed controller of control unit 100. In response to an error, this would not lead to an acceleration of the vehicle, and therefore it cannot be detected by monitoring unit 130. In this case, a usual monitoring of the idling speed would detect a corresponding error.

If query 300 detects that the vehicle is not traveling on level ground, there follows query 330. This query checks whether the vehicle is traveling downhill. The occurrence of an acceleration during uphill travel as a result of an error can be clearly distinguished from an acceleration as a result of downgrade forces as a result of the vehicle mass and the angle of gradient. The engine force is calculated by monitoring unit 130 with the aid of the injected fuel quantity QK. Deducting the outer road resistances and the drive train losses, the remaining force yields an acceleration or a deceleration. The admissible acceleration AW is calculated by monitoring unit 130 from the remaining drive force and vehicle mass M. During downhill travel, this procedure essentially differs in that the downgrade force is considered the additional force. During downhill travel, starting from the vehicle mass and the angle of gradient, one can clearly distinguish an acceleration as a result of downgrade forces from an acceleration caused by an error in the control unit. According to example embodiments of the present invention, even during downhill travel, the engine force is calculated by monitoring unit 130 with the aid of injected fuel quantity QK. While considering the outer road resistances, such as the rolling resistance and the air resistance, the drive train losses and the downgrade force, one obtains the remaining force and an acceleration or deceleration of the vehicle. Starting from these variables, the desired or admissible acceleration AW is calculated by monitoring unit 130 while taking into consideration the vehicle mass. If this desired acceleration deviates from measured acceleration A, that is recorded by sensor 140, especially its component A1 in the direction of the vehicle axis, an error is detected. Preferably, the difference of the two accelerations, that is, the difference between the desired and the measured acceleration is calculated. If this difference is greater than an applied threshold, this indicates an error.

If query 330 detects that downhill travel is taking place, query 340 checks whether the clutched state is present. If this is not the case, that is, the clutch is being operated or the converter of an automatic transmission is open, this is detected by monitoring unit 130. In this case, the compression forces of the engine remain without influence and the vehicle is accelerated based on the downgrade force. The internal combustion engine is held in the idling speed range by the idling speed controller of control unit 100. If an error occurs in this state, the vehicle is not accelerated, that is, this error cannot yet be detected by the procedure according to example embodiments of the present invention. But this error would be detected because the rotational speed in the idling case is greater than the idling speed.

If query 330 detects that no downhill travel is taking place, there then follows step 470. The error monitoring can take place in this instance correspondingly as described beginning at query 310. This means that monitoring during travel on level ground or uphill differs only slightly. During uphill travel, the downgrade force can be considered as an additional force that works counter to the motion.

If query 340 detects that the clutched state exists, there follows additional query 350, as to whether the engine is in the overrun condition. If this is the case, a change in the angle of gradient has an influence on the road resistance. This means that during downhill travel in overrun condition, an acceleration of the vehicle occurs if the vehicle's weight force, as a result of the angle of gradient, in the direction of travel has overcome the road resistances, including the transmission efficiency of the drive train and the compression force of the engine. If the engine speed falls below the idling speed, the idling speed controller of control unit 100 acts such that sufficient fuel is injected so that the idling speed is held in the idling speed range. That is, the vehicle is accelerated until the upper speed limit of the idling speed controller range is reached.

If query 350 detects that there is no overrun condition, that is, in the clutched driving state at downhill travel the driver desires an acceleration, then the driver regulates the desired torque required for the desired acceleration by the setting of the accelerator pedal. In response to an error in which injections would take place, the vehicle would accelerate in an undesired manner. If the vehicle continues to accelerate in an undesired manner, if the driver lets up on the accelerator, the control unit detects an overrun condition.

According to example embodiments of the present invention, starting from different variables that are present in the control unit, such as the clutch being operated or not operated, and variables recorded using sensors, various operating states are detected. In these operating states, the forces that act upon the vehicle are ascertained, and starting from this ascertained force and the vehicle's mass, a desired or admissible acceleration AW is determined. This desired acceleration is compared to actual acceleration A. The actual acceleration may be recorded using sensor 140, in this instance component A1 of the acceleration in the direction of the vehicle's longitudinal axis being taken into consideration. Second component A2 of the acceleration perpendicular to the vehicle's longitudinal axis is used, in this instance, to distinguish between states of the vehicle, particularly to detect whether the vehicle is traveling downhill, uphill or on level ground.

If additional sensors are available that detect accelerations, additional forces which act upon the vehicle can be taken into consideration. Thus, for instance, using a sensor transversely to the vehicle's longitudinal axis, cornering and the forces occurring in conjunction with it can be ascertained and considered.

The vehicle mass is an important variable that goes into the calculation of the acceleration. Therefore it is provided, according to example embodiments of the present invention, that in one simple specific embodiment a fixed mass is considered. In an example embodiment it is provided that, in certain operating states, the mass of the vehicle is ascertained anew in each case and is subsequently calculated in travel operation for the calculation of the acceleration. In response to each driving off, or in response to the first acceleration of the vehicle from standstill, the vehicle mass may be ascertained. In the ascertainment of the vehicle mass, the same variables are used as for the error detection.

It may be provided that, in a first step, a rough check is made as to whether an error has occurred. This can be done, for example, by checking using the mass of the vehicle when it is empty. If this supplies the result that there is no error, the vehicle's mass is determined starting from the corresponding variables and is subsequently used for error monitoring. Alternatively, instead of the empty weight, one may also use the last mass used when parking as the vehicle mass, or a fixed value for the mass. In this context, it should be provided that the threshold values, at whose exceeding errors are detected, have to have correspondingly greater tolerances.

After that, the exact value of the instantaneous vehicle mass is calculated. In further operation, there takes place the one very accurate error monitoring starting from this exact value of the current vehicle mass.

Both for the ascertainment of the vehicle mass in selected operating states and also for error monitoring, the same connections and relationships between the measured variables, the constants and the quantities to be determined may be used. This means that, starting from certain relationships, the mass of the vehicle is determined after the start or after the drive off. It is assumed, in this instance, that there is not yet any error. Up to that point, the monitoring for undesired acceleration is made using the initial values. The mass of the vehicle in the empty state, for example, is as such an initial value. Subsequently, during travel of the vehicle, and starting from the same relationships, the desired acceleration AW of the vehicle is calculated. This desired acceleration is then checked for plausibility using measured acceleration AQ. In this context, both components of the signal of the acceleration sensor can be used for ascertaining the operating state, for ascertaining the mass of the vehicle and/or for ascertaining the measured acceleration.

Figure 3A:
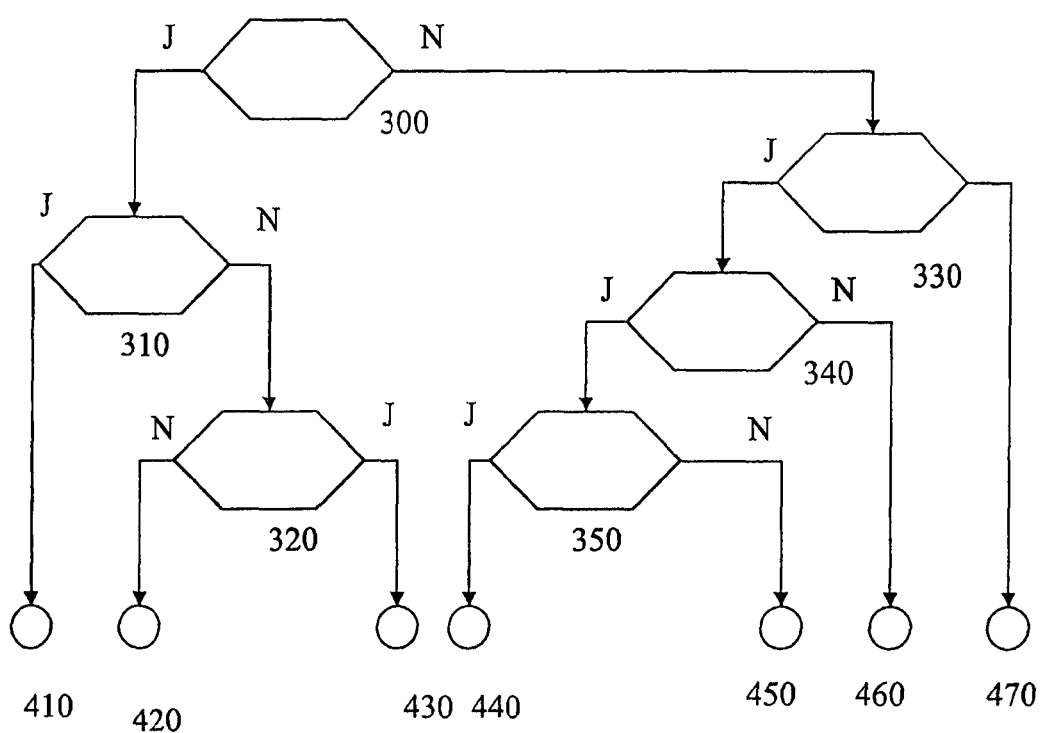
Figure 3B:
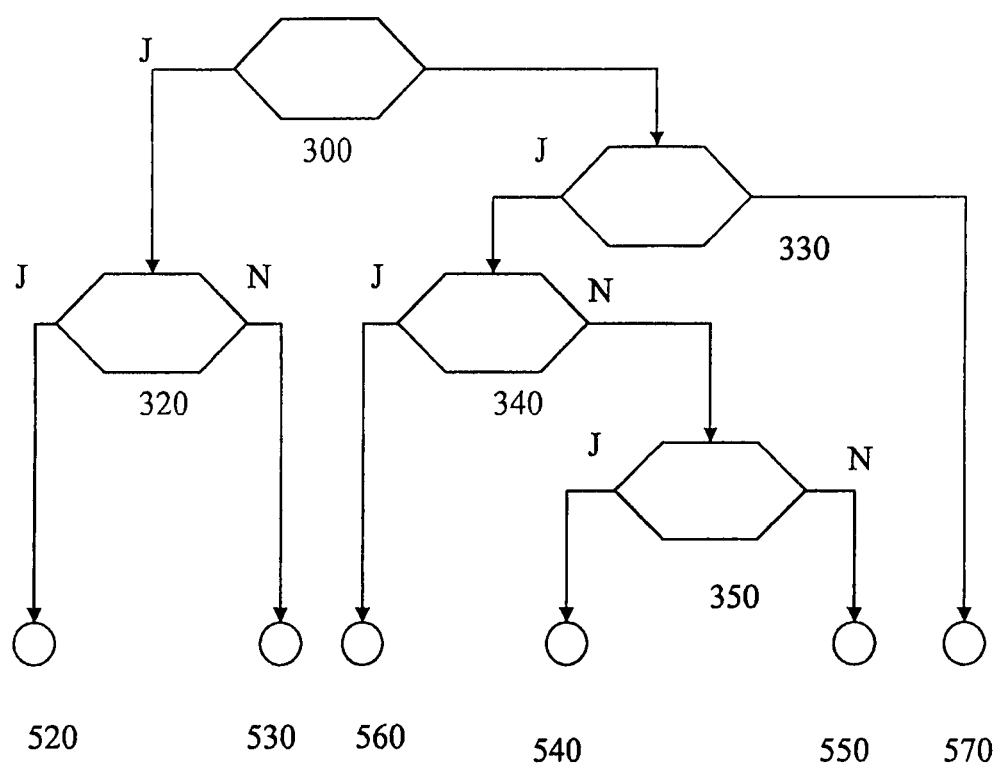

In the following, the ascertainment of the mass is explained in light of the flow chart according to FIG. 3b. It is checked, in various queries, in which travel state the vehicle currently is. These queries correspond to the queries in FIG. 3a, and are designated correspondingly.

If queries 300 and 320 detect that the vehicle is moving on level ground, and the engine is declutched, the mass is calculated as follows in step 520. In this state, the following equations apply for the forces that act upon the vehicle:

$0 = FT - FL - FRo$ $FT = M*A$ $FL = 0.5*K1*K2(V-V0)^2$ $FRo = K3*M$ $M = FL/(A-K3)$

In these equations, FT is the mass moment of inertia of the vehicle, FL is the force requirement to overcome air resistance, and FRo is the force to overcome rolling resistance. The quantities K1, K2 and K3 are constants, which are preferably specific to the vehicle. Quantity V is the current speed of the vehicle, and V0 is the speed of the vehicle at which the constants K1 and/or K2 are determined.

In the development phase and the application phase, these constants are determined specifically for the vehicle, and stored in control unit 100 or in monitoring unit 130, so that only the vehicle speed is the single variable. For rolling resistance Fro, the smallest rolling resistance is assumed, in an example embodiment. If the control unit has a "bumpy road detection", the coefficient of rolling resistance, that is, constant K1, can be adapted accordingly.

Starting from the formula for vehicle mass M, it is calculated, stored in a memory and used in the following travel cycle. It may be provided that an updating also takes place during the travel cycle. This is meaningful, for instance, after a stopping of the vehicle, even with the engine running.

If queries 300 and 320 detect the state, vehicle is moving on level ground, and the engine is clutched and there is a driver's acceleration command, the vehicle's mass is calculated as follows in step 530. In this state, the following equations apply for the forces that act upon the vehicle:

$$0 = -FT + FM - FL - FRo - F\ddot{U}$$

$$M = (FM - F\ddot{U} - FL)/(A + K3)$$

in which the variable FM is the engine drive force and FÜ is the transmission resistance force of the drive train.

The engine propulsion power FM is calculated by the control unit with the aid of the injected fuel quantity QK. Drive train losses FÜ are represented substantially by the transmission efficiency of the drive train, which is known specifically for each vehicle and is treated as a vehicle-specific parameter, that is, it is ascertained within the scope of the application and stored in the control unit.

Starting from the formula for vehicle mass M, it is calculated, stored in a memory and used in the following travel cycle. It is advantageous if an updating also takes place during the travel cycle. This is meaningful, for instance, after a stopping of the vehicle, even with the engine running.

If queries 300 and 330 detect downhill travel, the calculation of the vehicle mass takes place as in the states described below.

If queries 300, 330 and 340 detect that the state of downhill travel having clutched engine and overrun condition are present, the following equations apply.

$$0 = FT + FH - FL - Fro - F\ddot{U}$$

$$S = 0.5 * KG * \text{SIN}(W) + VN * t$$

$$FH = M * KG * \text{SIN}(W)$$

$$M = (FL + F\ddot{U})/(A + KG * \text{SIN}(W) - K3)$$

where variable FH is the downgrade force.

Variable S represents the path traveled in time t. VM gives the speed, measured by wheel rotational speed sensors, which is present at the start of the measurement of angle of gradient, which is also designated as angle of descent. Quantity KG is a constant.

Starting from the formula for vehicle mass M, it is calculated, stored in a memory and used in the following travel cycle. In this context, angle W is determined starting from the formula for the quantity S. It is advantageous if an updating also takes place even during the travel cycle. This is meaningful, for instance, after a stopping of the vehicle, even with the engine running.

If queries 300, 330, 340 and 350 detect the state of downhill travel, declutched, in overrun condition, the mass is calculated as follows in step 540.

The vehicle's mass can be calculated as follows, in this operating state:

$$0 = FT + FH - FL - FRo$$

$$M = FL/(A + KG * \text{SIN}(W) - K3)$$

Starting from the formula for vehicle mass M, it is calculated, stored in a memory and used in the following travel cycle. It may be provided an updating takes place even during the travel cycle. This is meaningful, for instance, after a stopping of the vehicle, even with the engine running.

If queries 300, 330, 340 and 350 detect the state of downhill travel, declutched and not in overrun condition, no mass calculation takes place in step 550, in the exemplary embodiment shown.

If queries 300, 330 and 340 detect the state of downhill travel, clutched and driver's acceleration command, the mass is calculated as follows in step 560.

The driver regulates the torque command necessary for the desired acceleration by setting the accelerator. In the case of an erroneous control unit or its peripherals, such as sensors or a function that would lead to injections, the vehicle would accelerate in an undesired manner. If the vehicle continues to accelerate in an undesired manner, the driver would, however, finally want to regulate via the accelerator until taking his foot completely off the accelerator and the control unit detects an overrun condition.

In the correct case, the vehicle mass can be calculated as follows by the control unit:

$$0 = FM + FH - FT - FL - FRo - F\ddot{U}$$

$$M = (FL + F\ddot{U} - FM)/(KG * \text{SIN}(W) - K3 - A)$$

The variable FM is the engine power. This is calculated by the control unit with the aid of the injected fuel quantity.

If query 330 detects uphill travel, no mass calculation takes place in the specific embodiment in step 570. A calculation of mass in steps 550 and 570 can be made by a combination of the above formulas.

Starting from the formula for vehicle mass M, it is calculated, stored in a memory and used in the following travel cycle. It may be provided that an updating takes place even during the travel cycle. This is meaningful, for instance, after a stopping of the vehicle, even with the engine running.

In an example embodiment, it may be provided that calculated acceleration AW and/or measured acceleration A1 of the acceleration vector of the sensor element along the vehicle be checked for plausibility, using an acceleration ascertained from the measured wheel rotational speed change.

Furthermore, it may be provided that the calculated and/or measured acceleration of the acceleration vector of the sensor element perpendicular to the vehicle be checked for plausibility from the change in the atmospheric pressure, which is measured using an atmospheric pressure sensor.

In an example embodiment it may also be provided that no acceleration sensors are provided, but rather that the accelerations are calculated from the wheel rotational speed change (longitudinal axis) and the change in the atmospheric pressure (vertical axis).

What is claimed is:

1. A computer-implemented method for controlling a drive unit of a vehicle, comprising:
   determining a mass of the vehicle after each standstill, when a first acceleration occurs;
   determining, by a processor, a first acceleration variable, which is determined at least from an operating state of the drive unit,
   receiving, by the processor, a second acceleration variable which is sensed by an acceleration sensor, wherein the second acceleration variable includes a first component, in a direction of a vehicle longitudinal axis, and a second component, perpendicular to the vehicle longitudinal axis;
   comparing, by the processor, the first acceleration variable with the second acceleration variable;

determining a difference between a desired acceleration, which determined based on an ascertained force and the mass, and a measured acceleration;

detecting, by the processor, an error if the difference is greater than an applied threshold; and controlling, by the processor, metering of fuel to an internal combustion engine of the vehicle, taking into consideration the detected error; wherein the first acceleration variable is determined as a function of the second component of the second acceleration variable, the error is detected if a value of the second acceleration variable deviates from a value of the first acceleration variable, and at least one of (a) at least one variable characterizing an injected fuel quantity and (b) the second acceleration variable is taken into consideration as the operating state of the drive unit.

2. The method according to claim 1, wherein the second acceleration variable is measured using at least one sensor.

3. The method according to claim 1, wherein the first component and the second component are measured using at least one acceleration sensor.

4. The method according to claim 1, wherein the first component is measured using an acceleration sensor and the second component is measured using an inclination sensor.

5. The method according to claim 1, wherein the first acceleration variable is determined at least starting from the determined mass of the vehicle.

6. The method according to claim 1, wherein the determined mass of the vehicle is determined in certain operating states at least starting from the vehicle acceleration and additional vehicle-specific characteristics variables.

7. The method according to claim 1, wherein the determined mass of the vehicle is determined in certain operating states at least starting from the second acceleration variable.

8. The method according to claim 1, wherein the error is detected if the value of the second acceleration variable is greater than a value of the first acceleration variable.

9. The method according to claim 1, further comprising:
determining if the vehicle is traveling on level ground or on a downhill grade, and if so, then it is checked whether a clutched state is present, and if not the vehicle is accelerated based on a downgrade force, and if the error occurs, the vehicle is not accelerated.

10. A device for controlling a drive unit of a vehicle, comprising:
a device configured to perform the following:
determine a mass of the vehicle after each standstill, when a first accelerating occurs;
determine a first acceleration variable, which is determined at least starting from an operating state of the drive unit;
receive a second acceleration variable which is sensed by an acceleration sensor, wherein the second acceleration variable includes a first component, in a direction of a vehicle longitudinal axis, and a second component, perpendicular to the vehicle longitudinal axis;
compare the first acceleration variable with the second acceleration variable;
determine a difference between a desired acceleration and a measured acceleration;
detect an error if the difference is greater than an applied threshold; and controlling metering of fuel to an internal combustion engine of the vehicle, taking into consideration the detected error; wherein the first acceleration variable is determined based on the second component of the second acceleration variable, wherein the error is detected if a value of the second acceleration variable deviates from a value of the first acceleration variable, and wherein at least one of (a) at least one variable characterizing an injected fuel quantity and (b) the second acceleration variable is taken into consideration as the operating state of the drive unit.

11. The device according to claim 10, wherein the second acceleration variable is measured using at least one sensor.

12. The device according to claim 10, wherein the first component and the second component are measured using at least one acceleration sensor.

13. The device according to claim 10, wherein the first component is measured using an acceleration sensor and the second component is measured using an inclination sensor.

14. The device according to claim 10, wherein the first acceleration variable is determined at least starting from the determined mass of the vehicle.

15. The device according to claim 10, wherein the determined mass of the vehicle is determined in certain operating states at least starting from the vehicle acceleration and additional vehicle-specific characteristic variables.

16. The device according to claim 10, wherein the determined mass of the vehicle is determined in certain operating states at least starting from the second acceleration variable.

17. The device according to claim 10, wherein the error is detected if the value of the second acceleration variable is greater than a value of the first acceleration variable.

18. The device according to claim 10, wherein at least one of (a) at least one variable characterizing an injected fuel quantity and (b) the second acceleration variable is taken into consideration as the operating state of the drive unit, and wherein the second acceleration variable is measured using at least one sensor.

19. The device according to claim 18, wherein the first acceleration variable is determined at least starting from the determined mass of the vehicle, and wherein the determined mass of the vehicle is determined in certain operating states at least starting from the vehicle acceleration and additional vehicle-specific characteristic variables.

20. The device according to claim 18, wherein the first acceleration variable is determined at least starting from the determined mass of the vehicle, and wherein the determined mass of the vehicle is determined in certain operating states at least starting from the second acceleration variable.

21. The device according to claim 10, wherein at least one of (a) at least one variable characterizing an injected fuel quantity and (b) the second acceleration variable is taken into consideration as the operating state of the drive unit, and wherein the first component and the second component are measured using at least one acceleration sensor.

22. The device according to claim 21, wherein the first acceleration variable is determined at least starting from the determined mass of the vehicle, and wherein the determined mass of the vehicle is determined in certain operating states at least starting from the vehicle acceleration and additional vehicle-specific characteristic variables.

23. The device according to claim 21, wherein the first acceleration variable is determined at least starting from the determined mass of the vehicle, and wherein the determined mass of the vehicle is determined in certain operating states at least starting from the second acceleration variable.

24. The device according to claim 10, wherein at least one of (a) at least one variable characterizing an injected fuel quantity and (b) the second acceleration variable is taken into consideration as the operating state of the drive unit, and wherein the first component is measured using an acceleration sensor and the second component is measured using an inclination sensor.

25. The device according to claim 24, wherein the first acceleration variable is determined at least starting from the determined mass of the vehicle, and wherein the determined mass of the vehicle is determined in certain operating states at least starting from the vehicle acceleration and additional vehicle-specific characteristic variables.

26. The device according to claim 24, wherein the first acceleration variable is determined at least starting from the determined mass of the vehicle, and wherein the determined mass of the vehicle is determined in certain operating states at least starting from the second acceleration variable.

27. The device according to claim 10, wherein it is determined if the vehicle is traveling on level ground or on a downhill grade, and if so, then it is checked whether a clutched state is present, and if not the vehicle is accelerated based on a downgrade force, and if the error occurs, the vehicle is not accelerated.

* * * * *